United States Patent [19]

Sasiela et al.

[11] 4,152,102

[45] May 1, 1979

[54] APPARATUS FOR THE PREPARATION OF EXTRUDED FOOD PRODUCTS

[75] Inventors: Ronald J. Sasiela, Whitestone, N.Y.; James D. Smith, Ponchatoula, La.

[73] Assignee: Modern Maid Food Products, Inc., Garden City, N.Y.

[21] Appl. No.: 794,621

[22] Filed: May 6, 1977

[51] Int. Cl.² ............................................. A21C 11/16
[52] U.S. Cl. .................................. 425/288; 425/308; 425/311
[58] Field of Search ............... 425/287, 288, 325, 308, 425/310, 311, 403.1, 403, 392, 393, 380, 381

[56] References Cited

U.S. PATENT DOCUMENTS

| | | | |
|---|---|---|---|
| 1,702,191 | 2/1929 | Bergner | 425/287 |
| 1,870,654 | 8/1932 | Schoel | 425/381 X |
| 2,126,416 | 8/1938 | Schlichter | 425/288 |
| 2,779,298 | 1/1957 | Chwirut et al. | 425/381 X |
| 3,143,085 | 8/1964 | Gebhardt et al. | 425/288 |
| 3,947,178 | 3/1976 | Belshaw | 425/287 X |

FOREIGN PATENT DOCUMENTS

490353 12/1927 Fed. Rep. of Germany ........... 425/308
2051915 5/1971 Fed. Rep. of Germany ........... 425/288

*Primary Examiner*—William R. Briggs
*Attorney, Agent, or Firm*—Lerner, David, Littenberg & Samuel

[57] ABSTRACT

An improved method and apparatus for preparing shaped extruded food products are disclosed. The invention comprises providing nozzle extension means on conventional extrusion apparatus which includes an extrusion head adapted for the passage of a slurry of food particles therethrough, a first member positioned with respect to one end of the extrusion head and having a cutter edge which cooperates with the extrusion head to define an extrusion nozzle for the formation of the shaped food product, and a second member having a cutter edge and mounted for relative movement with respect to the extrusion head so as to cut off successive extrusions of the shaped food product formed at the nozzle. The nozzle extension means is positioned at the nozzle and cooperates therewith to receive the shaped extruded product as it is severed and to maintain the product in a predetermined spatial orientation with respect to the extrusion head subsequent to severance.

10 Claims, 9 Drawing Figures

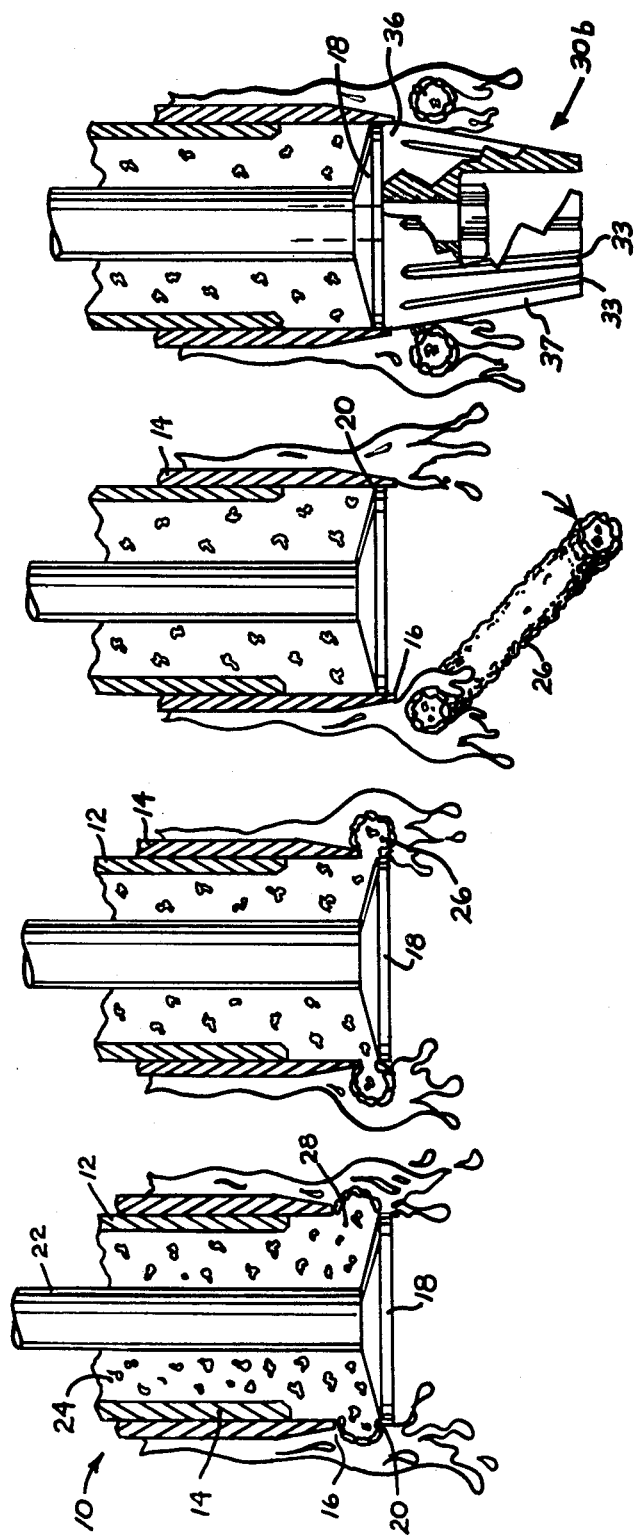

APPARATUS FOR THE PREPARATION OF EXTRUDED FOOD PRODUCTS

BACKGROUND OF THE INVENTION

The preparation of shaped extruded food products from a slurry of comminuted foods is well known. For example, in U.S. Pat. No. 3,650,766 a method for the preparation of such shaped products is disclosed which involves the preparation of a slurry of comminuted foods including a gel-forming material which gels upon exposure to a gelation solution. The slurry is extruded into a desired shape through an extrusion nozzle which, in all material respects, is quite similar to conventional donut-forming apparatus. The resulting shaped product is then subjected to a bath or spray of gelation solution to form a skin or envelope which maintains the structure of the shaped product during further processing such as coating, freezing, baking, frying, and the like.

Conventional apparatus for the preparation of such products is disclosed in U.S. Pat. No. 3,814,560. Typically, such apparatus comprises an extrusion head and a cutter-plate or disc which cooperate to define an extrusion nozzle, and a cutter-sleeve. The cutter-plate and sleeve are movable relative to each other so as to cut off successive extrusions from the extrudable slurry of comminuted food particles which is forced through the extrusion head. Such apparatus also includes means for periodically charging the head with the extrudable slurry so as to form the successive extrusions at the nozzle. Where, as noted above, the extrudable slurry includes a gel-forming material which is gelable upon exposure to a gelation solution, the shaped extruded product is typically dropped into a bath which contains the gelation solution thus serving to form a gelled skin about the product which holds the product together during further processing. As described in detail in U.S. Pat. No. 3,814,560, the extruded product will normally be carried through the gelation or setting bath on a conveyor which will then continue to carry the extruded product through further processing stages such as battering, breading, frying, etc.

Due to the rather fibrous nature of the food products which may be incorporated into various products made according to the above technique, the severing of successive extrusions at the extrusion nozzle is often incomplete and a "hinging" effect is experienced. Specifically, in the case of extruded onion rings or clam strips, for example, a small piece of onion or clam can often get caught between the cutter-plate and cutter-sleeve thereby preventing immediate and complete severance of the extruded shape at the nozzle. This effect is particularly pronounced where there is an excess clearance between the cutter-plate and sleeve which can be caused by wear on the cutter-sleeve over extended periods of usage. The result of such "hinging" is that the desired spatial orientation of the product with respect to the extrusion head, as it leaves the nozzle and drops onto the conveyor belt for passage through the setting bath and on for further processing, will not be maintained and thus the product will drop onto the belt in a deformed shape or will be deformed upon contact with the belt. Further, complete severance may not be obtained at all thus resulting in multiple extrusions which are physically connected together. In order to avoid these problems, it has heretofore been necessary to have production personnel present at the extruder to manually separate the pieces from each other, and, where the effect cannot be avoided, to remove the deformed products, or "cripples" as they are known in the art, from the conveyor prior to further processing. In fact, the state-of-the-art today is such that available extrusion apparatus operates at speeds of up to 300 strokes per minute giving as many as 6 extrusions per second, thus making inspection and manual correction difficult tasks to accomplish.

It is therefore an object of the present invention to provide an improved method and apparatus for preparing shaped extruded food products which avoid the problem of "hinging" presently encountered by existing apparatus, and do so in a manner which avoids the need for production personnel to manually correct the problem.

It is a further object of the present invention to provide an improved method and apparatus for preparation of shaped extruded food products which will serve to maintain a predetermined spatial orientation of the shaped product with respect to the extrusion head after severance of product at the extrusion nozzle such that "hinging" of the product will be avoided.

It is still a further object of the present invention to provide an improved method and apparatus for the preparation of extruded food products which serve to maintain the shape of the extruded product while the product is maintained in a predetermined spatial orientation with respect to the extrusion head after severance at the nozzle.

SUMMARY OF THE INVENTION

In accordance with the present invention, an improved method and apparatus for the preparation of shaped extruded food products are provided which comprise the provision of nozzle extension means positioned at the nozzle of conventional extrusion apparatus. The nozzle extension means cooperates with the nozzle to receive the shaped extruded food product as it is severed and to maintain the shaped extruded product in a predetermined spatial orientation with respect to the extrusion head subsequent to severance. By the provision of the nozzle extension means, the problem of "hinging", which is typical of prior art apparatus, is avoided thus resulting in fewer cripples on the production line and the elimination of additional production personnel to manually correct the problem.

The precise design of the nozzle extension means will vary depending upon the particular shape of extruded product being produced. For example, in the case of an extruded toroid such as an onion ring, the nozzle extension means can be cylindrical or can include a portion which is frustoconical in shape and which tapers from a maximum diameter at the extrusion nozzle to a minimum diameter at the free end of the nozzle extension means. In the case of semi-circular shaped products such as clam strips and the like, the nozzle extension means can include a portion which is frustoconical in shape and flairs from a minimum diameter at the nozzle to a maximum diameter at the free end of the extension means. Further, if desired, the nozzle extension means can be fluted in design to reduce the friction created between the surface of the means and the extruded product.

In a further embodiment of the present invention, the nozzle extension means is shaped so as to maintain the shape of the extruded product while such product is being maintained in a predetermined spatial orientation with respect to the extrusion head. In this embodiment, the nozzle extension means not only serves to avoid distortion of the shaped product by virtue of the "hinging" effect, but further serves to avoid shape distortion of the product by other external means prior to entry into the setting bath whereupon the gelled skin is formed which thereafter serves to maintain the shape of the product during further processing. Still further, the nozzle extension means in this embodiment of the invention serves to slow down the speed of the shaped product as it leaves the extrusion nozzle and drops towards the conveyor such that distortions in the product shape which can result from a lack of synchronization between the extrusion speed and the conveyor speed, will be avoided.

DESCRIPTION OF THE DRAWINGS AND DETAILED DESCRIPTION

Further objects and advantages of the present invention can be more fully appreciated by reference to the following detailed description and drawings, wherein:

FIGS. 1-3 illustrate a typical extrusion sequence on prior art apparatus shown in partial sectional views, and the "hinging" effect which has been described above;

FIGS. 4-6 are partial sectional views of extrusion apparatus including, respectively, three different embodiments of nozzle extension devices employing the principles of the present invention with parts broken away to illustrate further details of the apparatus;

Figure 9:
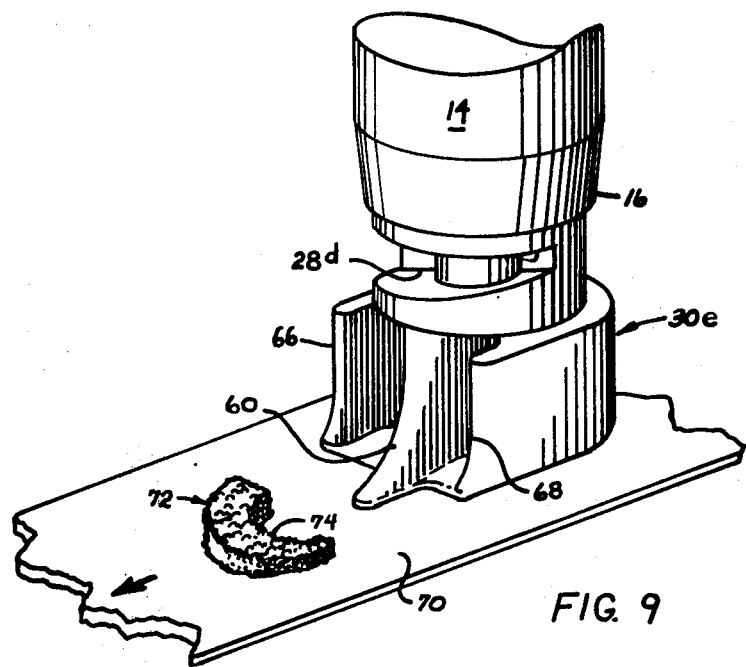
Figure 8:
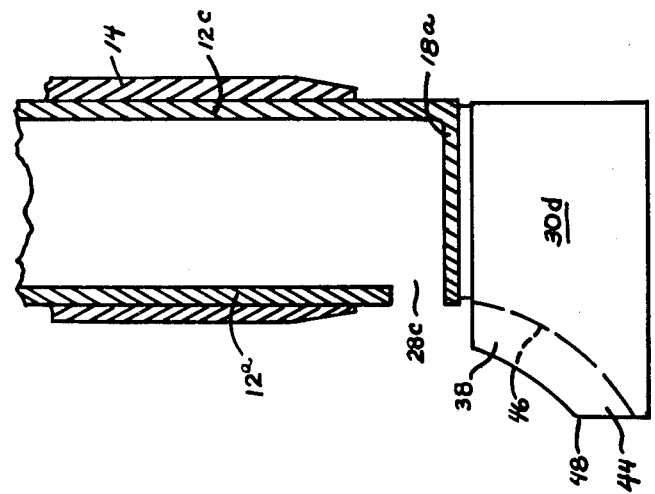

FIG. 8 is a side elevational view, with parts broken away, showing a nozzle for preparing stick-shaped products in conjunction with a further embodiment of the nozzle extension device constructed in accordance with the principles of the present invention; and FIG. 9 is a perspective view of part of an extrusion apparatus having a nozzle constructed so as to form shrimp-shaped products and nozzle extension means shaped to receive such product upon severance at the nozzle.

Referring now to the drawings, and initially to the prior art sequence shown in FIGS. 1-3, it can be seen that extrusion apparatus generally designated 10 is of the type shown in U.S. Pat. No. 3,814,560 and includes cylindrical extrusion head 12, a first member or cutter-plate 18 having a cutter-edge 20 mounted stationary with respect to the extruder head 12 on center support shaft 22, and a second member or cutter-sleeve 14 mounted for relative movement with respect to both the extruder head 12 and the cutter-plate 18, cutter-sleeve 14 having a cutter-edge 16. As described in U.S. Pat. No. 3,814,560, extrusion apparatus 10 further includes means for feeding the flowable slurry of comminuted food particles 24 into the extrusion head 12. The details of a typical method for the preparation of such slurry can be found in U.S. Pat. No. 3,650,766 noted above. In any event, as can be seen in the sequence shown in FIGS. 1-3, when the extrudable slurry 24 is forced through the extruder head 12, the pressure causes the slurry to be formed into a desired shape 26 which is determined by the nozzle 28 defined by the cooperation between the head 12 and the plate 18. The nozzle 28 shown in the sequence of FIGS. 1—3 is toroidal in shape and thus results in the formation of a toroid or ring-shaped product.

The "hinging" effect described above can best be appreciated by reference to FIG. 3 where the extruded product 26 has been severed at the nozzle by the passing of the cutter-edge 16 of the cutter-sleeve 14 past the cutter-edge 20 of the cutter-plate 18. The "hinging" effect results from a fibrous piece of food being caught between the plate 18 and the sleeve 14 and causes the product to be taken out of its proper spatial orientation with respect to the extrusion head. The problem which ultimately results is that when the product is finally severed completely, it drops onto the take-away conveyor (not shown) in a manner which can cause shape distortion or complete breakage thereof. Additionally, as described above, a further problem which can result is that complete severance may not be obtained at all thus causing multiple extrusions of two, three or more products which are physically connected together.

Figure 5:
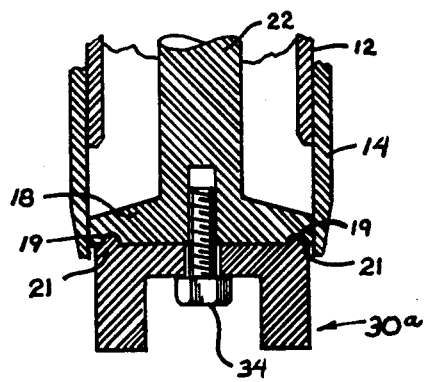

The aforementioned problems which are encountered with the prior art apparatus are avoided by the provision of nozzle extension means constructed in accordance with the principles of the present invention. Various embodiments of such nozzle extension means are shown in detail and designated in FIGS. 4-9 as 30a-e, respectively. Referring first to FIG. 5, where the nozzle defined by the extrusion head 12 and the cutter-plate 18 is toroidal in shape for the formation of ring-shaped products such as onion ring, nozzle extension means 30a can be cylindrical in shape having roughly the same diameter at the cutter-plate as at the free end thereof. In this embodiment, nozzle extension means 30a is secured to the cutter-plate 18 by means of bolt 34 which projects through the cutter-plate 18 into center support shaft 22. To facilitate proper alignment of the plate 18 and the nozzle extension 30a, the under surface of the plate is provided with recess 19 which receives aligning member 21 upstanding from nozzle extension 30a. As will be apparent to those of ordinary skill in the art, any other conventional means for achieving this same result may be employed.

In the embodiment shown in FIG. 4, nozzle extension means 30b includes fructoconical portion 37 which tapers from a maximum diameter adjacent cutter-plate 18 to a minimum diameter at the free end of the nozzle extension means. A tapered extension, as shown in FIG. 4, can be particularly beneficial in the manufacture of extruded onion rings where relatively large pieces of chopped onion have been incorporated into the extrudable slurry for purposes of texture. When the ring is initially extruded and the cutter-sleeve 14 cuts through a large piece of onion, a "plowing" effect is achieved which serves to tear and separate the onion pieces from those still within the nozzle, in the same fashion as would be achieved with the cylindrical nozzle extension means shown in FIG. 5. Once the straight portion 36 of the nozzle extension means 30b is passed by the product, a mild taper of from about 1°-5° serves as a guide for the ring to follow which aids in retaining its toroidal shape. While a similar effect is achieved with the extension means 30a, for relatively large diameter rings the taper is found to be particularly beneficial. If desired, flutes 33 can be provided to decrease the friction between the extruded product and the nozzle extension means thereby facilitating the free-fall of the product in the desired predetermined spatial orientation. Further, where the gelation solution, such as calcium chloride, is sprayed onto the product as it leaves the nozzle, the flutes also serve to channel excess solution away from the product, thus preventing a bitter after-taste that might otherwise result from such excess.

Figure 7:
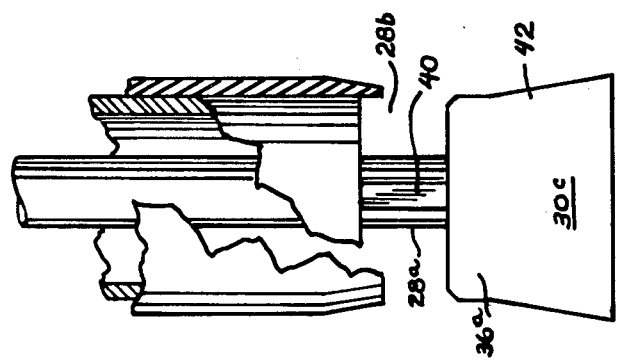
FIG. 7 is a side elevational view, partially in section and with parts broken away, of the apparatus shown in FIG. 6 illustrating in detail spacer elements separating the extrusion nozzle into two separate nozzle openings.
Figure 6:
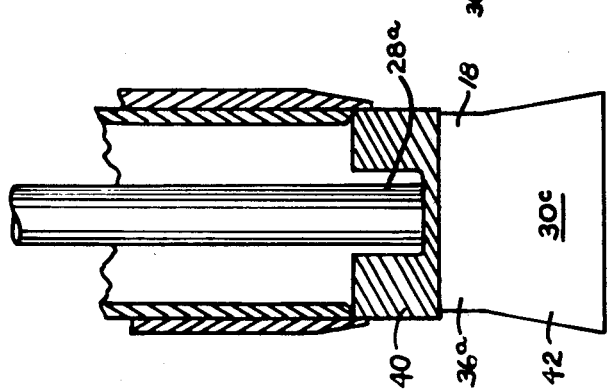

The embodiment 30c of the invention, shown in FIGS. 6 and 7, is particularly suited for the manufacture of semi-circular products such as clam strips and the like. Specifically, in order to form clam strips the apparatus includes a spacer 40 secured to, or manufactured integrally with, the cutter-plate 18. Spacer 40 serves to separate the nozzle into two approximately semi-circular nozzle openings 28a and 28b. As can readily be seen, during the extrusion sequence a single extrusion will result in the formation of two semi-circular, clam strip-shaped products at one time. While such nozzle configuration can be used in conjunction with the cylindrical nozzle extension 30a, shown in FIG. 5, it is preferred that the flaired nozzle extension 30c, as illustrated in FIGS. 6 and 7, be utilized. It should be noted that regardless of the specific shape of the nozzle extension used, the plowing effect described above is nevertheless achieved, i.e., when a fibrous piece of food in the slurry is caught between the cutter-sleeve and cutter-plate during the downward stroke of the cutter-sleeve, the extruded strip product tends to hug the nozzle extension thereby causing the fibers of the caught piece to be stretched and broken so that a free-fall condition of the product follows.

The flaired extension 30c, shown in FIGS. 6 and 7, can be seen to include straight portion 36a and frusto-conical portion 42. Thus, it will be appreciated that the shape of the flaired extension 30c in addition to maintaining the desired spatial orientation of the extruded product, causes the product to be urged from the center line of the nozzle and the resultant friction created between the extension and the extruded product serves to slow down the speed of the product as it falls after severance. This in turn serves to improve the spacing of the extruded strips on the take-away conveyor.

In a further embodiment of the present invention, the nozzle extension means is shaped so that it is operative to prevent deformation of the extruded product while it is being maintained in its predetermined spatial orientation subsequent to severance at the nozzle. To accomplish this end, at least a portion of the nozzle extension means is given a configuration corresponding to at least a portion of the external surface configuration of the shaped product. Specifically, during the manufacture of extruded stick-shaped products, such as artificial french fried potatoes or fish sticks, a square-shaped nozzle opening 28c is employed which, in the embodiment shown in FIG. 8, is defined by cutter-plate 18a formed integrally with extended extrusion head 12a. In the absence of nozzle extension 30d the desired straight stick-shape can become distorted since the speed of the extruded stick as it leaves the nozzle and the speed of the conveyor are difficult to synchronize. However, by the provision of the nozzle extension means 30d, shown in FIG. 8, the extruded stick is received by a trough 38 formed by two upstanding wall portions 48 and 44 and a bottom portion 46. The portions defining the trough cooperate to provide a surface which is adapted to receive and guide the stick-shaped product towards the conveyor thereby maintaining its straight shape and slowing down its speed by the friction created between the product and the surface. The slope of the trough can also be varied, if desired, to increase or decrease this effect which in turn serves to improve the spacing of the stick-shaped products on the conveyor in much the same fashion as described above with respect to the flaired nozzle extension 30c shown in FIGS. 6 and 7.

Still another embodiment of the present invention is shown in FIG. 9 wherein the nozzle 28d is shaped so that the extruded product 72 will be shrimp-shaped and include concave external peripheral surface portion 74. In this embodiment, the nozzle extension 30e will be similar to that shown in FIG. 8 but will include a central convex portion 60 which corresponds to surface 74 of the shrimp-shaped product. Convex portion 60 thus provides a surface which is adapted to receive the product as it is formed at the extruder and the friction created between the surface and the product decelerates the product enabling a more uniform spacing of product on the conveyor 70 which carries the product through further processing stages as described in more detail above. As shown in FIG. 9, extension means 30e also includes upstanding wall portions 66 and 68 which serve to maintain the product in proper contact with portion 60.

The nozzle extension devices of the present invention can be made of any suitable material, such as plastic, aluminum, stainless steel, and the like. Further, the device can be separately machined and secured to the cutter-plate in the manner described above with reference to FIG. 5, or can be manufactured integrally with the cutter-plate as shown in FIGS. 6 and 7. Regardless of which technique is used, those skilled in the art will appreciate that the specific shape of the nozzle extension will vary depending upon the shape of the extruded product being prepared. In this regard, the details of the extrusion apparatus are not considered part of the present invention but are well known in the prior art and can comprise the use of different geometrically shaped cutter-plates in conjunction with extrusion heads or a separately machined extrusion head which incorporates an integral cutter-plate as shown in FIG. 8. Further, it will be appreciated that the actual dimensions of the apparatus and the nozzle extension means will vary depending upon the size of the particles of comminuted food product included in the extrudable slurry, the diameter of the nozzle, the diameter of the center support shaft, if any, geometry of the cutter-plate, the height of the nozzle above the take-away conveyor, etc.

It is finally noted that a further and unexpected advantage which results from the present invention is a decreased requirement for maintenance of the equipment to correct the problem of excess clearance between the cutter-sleeve and extrusion head which is caused by normal wear. Specifically, since the "hinging" effect and problem of multiple extrusions are avoided in accordance with the present invention, the effect of an excess clearance which causes such problems to be more pronounced will not be as significant and, therefore, frequent maintenance to prevent such excess clearance will be unnecessary.

While the invention has been described with a certain degree of particularity, it will be understood that the description was by way of example only, that the principles of the present invention would be adaptable for extruded products of any size or shape, and that numerous variations and modifications, as may become apparent to those skilled in the art, can be made without departing from the spirit and the scope of the invention as hereinafter claimed.

We claim:

1. Apparatus for preparing a shaped food product from an extrudable slurry of food particles comprising, an extrusion head adapted for the passage of said slurry of said food particles therethrough;

a first member positioned with respect to one end of said extrusion head and having a cutter edge, said first member and said extrusion head cooperating to define a non-planar extrusion nozzle opening for the formation of a non-linear shaped food product, said nozzle opening having a vertical dimension which defines the vertical thickness of said shaped food product;

a second member having a cutter edge, and means mounting said second member for relative movement with respect to said extrusion head and said first member so as to cut off successive extrusions of said food product formed at said nozzle opening; and nozzle extension means positioned at said nozzle opening, said nozzle extension means including an upper portion adjacent said first member, said upper portion having a cross section and radial extent substantially the same as the cross section and radial extent of said first member, said nozzle extension means further having a vertical dimension greater than the vertical dimension of said nozzle opening, whereby said nozzle extension means cooperates with said nozzle opening to receive said shaped extruded product as it is severed and to maintain said extruded product in a predetermined spatial orientation with respect to said extrusion head subsequent to said severance.

2. The apparatus of claim 1 further comprising means mounting said nozzle extension means to said first member.

3. The apparatus of claim 1 wherein said nozzle extension means is integral with said first member.

4. The apparatus of claim 1 wherein said nozzle extension means is cylindrical.

5. The apparatus of claim 1 wherein said nozzle extension means is frustoconical in shape and tapers from a maximum diameter at said first member to a minimum diameter at a free end thereof.

6. The apparatus of claim 1 wherein said nozzle extension means is frustoconical in shape and flairs from a minimum diameter at said first member to a maximum diameter at a free end thereof.

7. The apparatus of claim 1 wherein said nozzle extension means is fluted.

8. Apparatus for preparing a shaped food product from an extrudable slurry of food particles comprising, an extrusion head adapted for the passage of said slurry of said food particles therethrough;

a first member positioned with respect to one end of said extrusion head and having a cutter edge, said first member and said extrusion head cooperating to define an extrusion nozzle opening for the formation of said shaped food product;

a second member having a cutter edge, and means mounting said second member for relative movement with respect to said extrusion head and said first member so as to sever successive extrusions of said food product formed at said nozzle opening; and nozzle extension means fixedly positioned at said nozzle opening and cooperating with said nozzle opening to receive, maintain and dispense said extruded product in a predetermined spatial orientation with respect to said extrusion head subsequent to said severance, said nozzle extension means having an upper end cooperating with said nozzle opening to receive said extruded product as it is severed, and a lower end from which said extruded product is dispensed, said nozzle extension means further including at least a portion intermediate said upper and lower ends which extends radially beyond the perimeter of said first member, said portion having a configuration corresponding to at least a portion of the external surface configuration of said shaped food product in order to maintain the extruded shape of said extruded product while said product is maintained in said predetermined spatial orientation with respect to said extrusion head.

9. The apparatus of claim 8 wherein said extrusion nozzle opening is rectangular so that said extruded food product will be stick-shaped and said nozzle extension means includes two upstanding wall portions separated by a bottom wall portion, said portions cooperating to provide a surface adapted to receive said stick-shaped product.

10. The apparatus of claim 8 wherein said nozzle opening is curvilinear having first and second ends, the vertical dimension of the opening being greater at said first end than said second end so that said extruded product will be shrimp-shaped including a concave external peripheral surface portion, and said nozzle extension means includes a central convex portion corresponding to said concave portion, said convex portion thereby providing a surface adapted to receive said shrimp-shaped product.

* * * * *